(12) United States Patent
Roffman et al.

(10) Patent No.: US 6,709,103 B1
(45) Date of Patent: Mar. 23, 2004

(54) METHODS FOR DESIGNING MULTIFOCAL OPHTHALMIC LENSES

(75) Inventors: Jeffrey H. Roffman, Jacksonville, FL (US); Daoud R. Iskander, Hawthorne (AU); Brett A. Davis, Cooparoo (AU); Michael J. Collins, Mt. Nebo (AU)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 10/284,613

(22) Filed: Oct. 31, 2002

(51) Int. Cl.⁷ .................................................. G02C 7/04
(52) U.S. Cl. .................... 351/161; 351/168; 623/6.27
(58) Field of Search .................... 351/161, 168, 351/169, 160 R, 160 H; 623/6.24, 6.27, 6.28, 6.29, 6.3

(56) References Cited

U.S. PATENT DOCUMENTS

| | | | |
|---|---|---|---|
| 4,580,882 A | 4/1986 | Nuchman et al. | 351/161 |
| 4,861,152 A | 8/1989 | Vinzia et al. | 351/161 |
| 4,952,048 A * | 8/1990 | Frieder et al. | 351/177 |
| 4,976,534 A | 12/1990 | Miege et al. | 351/161 |
| 5,530,491 A | 6/1996 | Baude et al. | 351/169 |
| 5,864,379 A | 1/1999 | Dunn | 351/161 |
| 5,926,250 A * | 7/1999 | Mukaiyama et al. | 351/168 |
| 6,030,077 A | 2/2000 | Sawano et al. | 351/161 |
| 6,142,625 A | 11/2000 | Sawano et al. | 351/161 |
| 6,145,987 A * | 11/2000 | Baude et al. | 351/169 |
| 6,322,213 B1 | 11/2001 | Altieri et al. | 351/161 |
| 6,520,638 B1 * | 2/2003 | Roffman | 351/177 |

FOREIGN PATENT DOCUMENTS

| WO | WO 95/26518 | 10/1995 |
|---|---|---|
| WO | WO 02/11194 A2 | 3/2002 |

* cited by examiner

Primary Examiner—Jordan M. Schwartz

(57) ABSTRACT

The invention provides methods for designing lenses useful for correcting presbyopia that permits variation of the speed of the power change from distance to near vision power or near to distance vision power. The rate of change may be symmetrical around the midpoint or faster or slower on either side of the midpoint.

12 Claims, 2 Drawing Sheets

METHODS FOR DESIGNING MULTIFOCAL OPHTHALMIC LENSES

FIELD OF THE INVENTION

The invention relates to ophthalmic lenses. In particular, the invention provides lenses that use more than one optical power, or focal length, and are useful in the correction of presbyopia.

BACKGROUND OF THE INVENTION

As an individual ages, the eye is less able to accommodate, or bend the natural lens, to focus on objects that are relatively near to the observer. This condition is known as presbyopia. Additionally, for persons who have had their natural lens removed and an intraocular lens inserted as a replacement, the ability to accommodate is totally absent.

Among the methods used to correct for the eye's failure to accommodate is the mono-vision system in which a person is fitted with one contact lens for distance vision and one lens for near vision. The mono-vision system permits the lens wearer to distinguish both distance and near objects, but is disadvantageous in that a substantial loss in depth perception results.

In another type of multifocal contact lenses, the optic zone of each lens is provided with more than one power. For example, the optic zone may have both distance and near power, which the eye uses simultaneously.

Neither of these methods provides good results in terms of visual acuity and lens wearer satisfaction. Thus, a need exists for lenses that both provide correction for the wearer's inability to accommodate and that overcome some or all of the disadvantages of known lenses.

DETAILED DESCRIPTION OF THE INVENTION AND PREFERRED EMBODIMENTS

Figure 1:
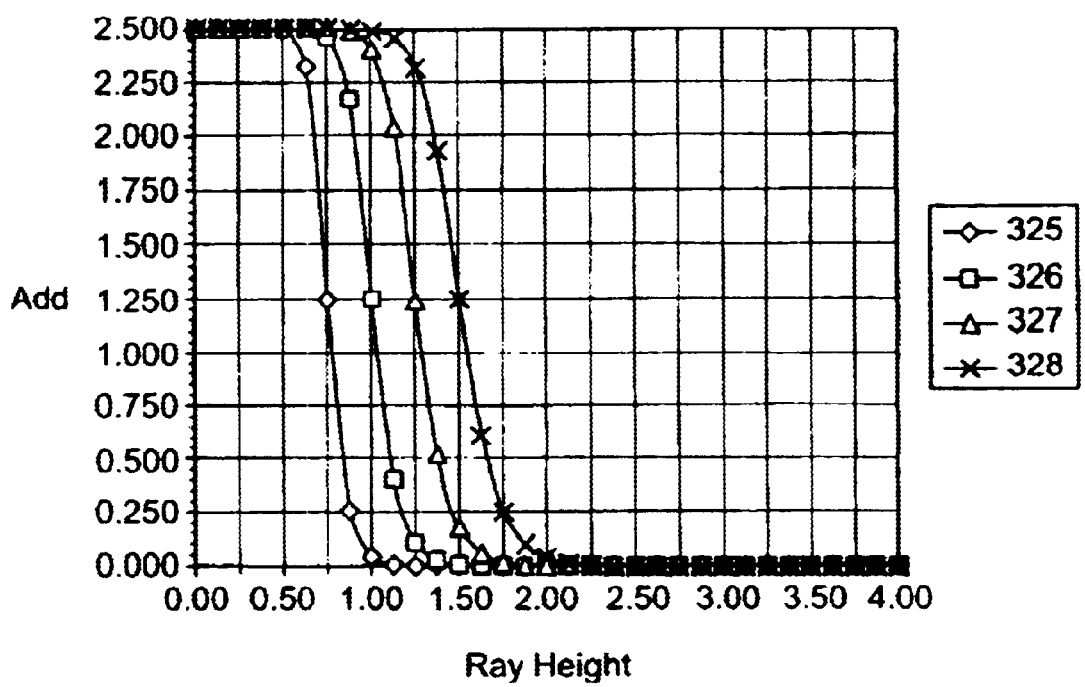
FIG. 1 is a graphic depiction of the power maps for progressive lens designs resulting from Equation I.

The invention provides methods for designing lenses useful for correcting presbyopia, lenses incorporating such designs, and methods for producing these lenses. In one embodiment, the method of the invention permits variation of the speed, or contour, of the power change from distance to near vision power or near to distance vision power. The result of this variation is that there is a better distribution of the distance and near vision powers within the multifocal zone and, thus, improved visual acuity and wearer satisfaction.

In one embodiment, the invention provides a multifocal ophthalmic lens comprising, consisting essentially of, and consisting of an optic zone having one or more multifocal power zones wherein a speed and a contour for the zone is determined by the following equation:

$$\text{Add}_{(x)} = \text{Add}_{peak} * (1/(a*(1+(x/x_c)^{2n}))) \tag{I}$$

wherein:

$\text{Add}_{(x)}$ is actual instantaneous add power at any point x on a surface of the lens;

x is a point on the lens surface at a distance x from the center;

a is a constant and preferably is 1;

$\text{Add}_{peak}$ is the full peak dioptric add power, or add power required for near vision correction;

$x_c$ is the cutoff semi-diameter or the midpoint in the power transition from distance to near power, or near to distance power;

n is a variable between 1 and 40, preferably between 1 and 20; and

Add is a value that is equal to the difference in power between the near vision power and distance vision power of the lens.

In Equation I, n is the variable that controls the slope of the progression from near to distance vision power and distance to near vision power in the lens. The less the value of n, the more gradual the progression will be.

In a second embodiment, the invention provides a multifocal ophthalmic lens comprising, consisting essentially of, and consisting of an optic zone having one or more multifocal power zones wherein a speed and a contour for the zone is determined by the following equation:

$$\text{Add}_{(x)} = \text{Add}_{peak} * (1/(a*(1+(x/x_c)^{2})*n)) \tag{II}$$

wherein:

$\text{Add}_{(x)}$ is actual instantaneous add power at any point x on a surface of the lens;

x is a point on the lens surface at a distance x from the center;

a is a constant and preferably is 1;

$\text{Add}_{peak}$ is the full peak dioptric add power;

$x_c$ is the cutoff semi-diameter;

n is is a variable between 1 and 40, preferably between 1 and 20; and

Add is a value that is equal to the difference in power between the near vision power and distance vision power of the lens.

In a third embodiment, the invention provides a multifocal ophthalmic lens comprising, consisting essentially of, and consisting of an optic zone having one or more multifocal power zones wherein a speed and a contour for the zone is determined by the following equation:

$$\text{Add}_{(x)} = \text{Add}_{peak} * (1/(a*(1+(x/x_c)^{d})*n)) \tag{III}$$

wherein:

$\text{Add}_{(x)}$ is actual instantaneous add power at any point x on a surface of the lens;

x is a point on the lens surface at a distance x from the center;

a is a constant and preferably is 1;

d is an arbitrary value between 1 and 40;

$\text{Add}_{peak}$ is the full peak dioptric add power;

$x_c$ is the cutoff semi-diameter;

n is between 1 and 40, preferably between 1 and 20; and

Add is a value that is equal to the difference in power between the near vision power and distance vision power of the lens.

For purposes of the invention, by "ophthalmic lens" is meant a spectacle lens, contact lens, intraocular lens, or the like. Preferably, the lenses of the invention are contact lenses. By "speed" or "contour" is meant the slope of the power change from near to distance power. By "distance vision power" is meant the amount of refractive power required to correct the wearer's distance vision acuity to the desired degree. By "near vision power" is meant the amount of refractive power required to correct the wearer's near vision acuity to the desired degree.

In the lenses of the invention, the multifocal power zones may be on the object-side, or front, surface, the eye-side, or rear, surface, or both surfaces. The multifocal power zones have at least two regions of differing power alternating between distance and near vision power. Intermediate power is provided as a consequence of the power progression between the peak of the power of the near and distance vision regions. In the lenses of the invention, the distance, near, and intermediate optical powers are spherical or toric powers.

In FIG. 1 is graphically depicted the power progression in four different multifocal power zone designs resulting from Equation I. In each design, the near vision power is at the center of the zone and the distance vision power is at or towards the periphery of the zone. By periphery is meant the region or area farthest from the center of the zone. The values used in Equation I for each of the designs is set forth in the following Table 1.

TABLE 1

|  | Design A | Design B | Design C | Design D |
| --- | --- | --- | --- | --- |
| a | 1 | 1 | 1 | 1 |
| $x_c$ | 0.625 | 0.875 | 1.125 | 1.375 |
| n | 7 | 7 | 7 | 7 |

Figure 2:
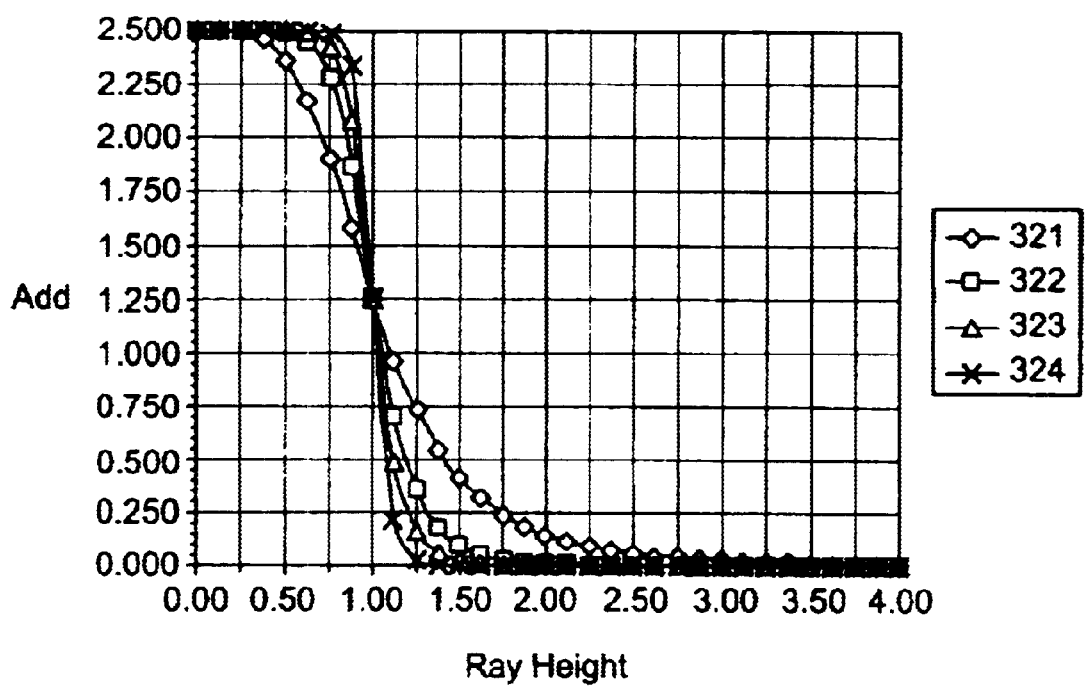
FIG. 2 is a graphic depiction of the power maps for progressive lens designs resulting from Equation I.

In FIG. 2 is graphically depicted the power progression for three different multifocal power zone designs resulting from Equation I. The values used in Equation I for each of the designs is set forth in the following Table 1.

TABLE 2

|  | Design E | Design F | Design G | Design H |
| --- | --- | --- | --- | --- |
| a | 1 | 1 | 1 | 1 |
| $x_c$ | 1.00 | 1.00 | 1.00 | 1.00 |
| n | 2.0 | 4.0 | 6.0 | 8.0 |

In each of FIGS. 1 and 2 is depicted the add power change as the power departs from the optic center of the lens. The design of the invention provides for a smooth, continuous variation in power from the optical center of the lens to the periphery of the optic zone. Additionally, the design permits a controllable rate of change and position of the power variation.

Equations I through III each have a value of n that is the same on either side of $x_c$. As an alternative, the value of n can be a first value when $x<x_c$ and second value for $x>x_c$. In this embodiment, $x=x_c$, n may be the first or second value.

The lenses of the invention may be made from any suitable lens forming materials. Illustrative materials for formation of soft contact lenses include, without limitation silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, such as etafilcon A.

A preferred contact lens material is a poly 2-hydroxyethyl methacrylate polymers, meaning, having a peak molecular weight between about 25,000 and about 80,000 and a polydispersity of less than about 1.5 to less than about 3.5 respectively and covalently bonded thereon, at least one cross-linkable functional group. This material is described in U.S. Serial No. 60/363,630 incorporated herein in its entirety by reference.

As yet another alternative, the lens material may be any material suitable for forming ophthalmic lens other than contact lenses. For example, spectacle lens materials may be used including, without limitation, polycarbonates, such as bisphenol A polycarbonates, allyl diglycol carbonates, such as diethylene glycol bisallyl carbonate (CR-39™), allylic esters, such as triallyl cyanurate, triallyl phosphate and triallyl citrate, acrylic esters, acrylates, methacrylates, such as methyl- ethyl- and butyl methacrylates and acrylates, styrenics, polyesters, and the like and combinations thereof. Additionally, materials for forming intraocular lenses include, without limitation, polymethyl methacrylate, hydroxyethyl methacrylate, inert clear plastics, silicone-based polymers, and the like and combinations thereof.

Curing of the lens material may be carried out by any convenient method. For example, the material may be deposited within a mold and cured by thermal, irradiation, chemical, electromagnetic radiation curing and the like and combinations thereof. Preferably, for contact lens embodiments, molding is carried out using ultraviolet light or using the full spectrum of visible light. More specifically, the precise conditions suitable for curing the lens material will depend on the material selected and the lens to be formed. Suitable processes are disclosed in U.S. Pat. No. 5,540,410 incorporated herein in its entirety by reference.

What is claimed is:

1. A multifocal ophthalmic lens, comprising an optic zone comprising one or more multifocal power zones having a distance vision power and a near vision power and wherein a speed for the optic zone is determined by the following equation:

$$\text{Add}_{(x)} = \text{Add}_{peak} * (1/(a*(1+(x/x_c)^{2n}))) \qquad (I)$$

wherein:

$\text{Add}_{(x)}$ is an instantaneous add power at any point x on a surface of the lens;

x is a point on the lens surface at a distance x from the center of the lens;

a is a constant;

$\text{Add}_{peak}$ is a full peak dioptric add power;

$x_c$ is a cutoff semi-diameter;

n is a variable between 1 and 40; and

Add is a value that is equal to the difference in power between the near vision power and distance vision power of the lens.

2. The lens of claim 1, wherein a is 1 and n is between 1 and 20.

3. The lens of claim 1 or 2, wherein the lens is a contact lens.

4. A multifocal ophthalmic lens, comprising of an optic zone comprising one or more multifocal power zones having a distance vision power and a near vision power wherein a speed for the optic zone is determined by the following equation:

$$\text{Add}_{(x)} = \text{Add}_{peak} * (1/(a*(1+(x/x_c)^2)*n)) \qquad (II)$$

wherein:

Add$_{(x)}$ is an instantaneous add power at any point x on a surface of the lens;

x is a point on the lens surface at a distance x from the center of the lens;

a is a constant;

Add$_{peak}$ is a full peak dioptric add power;

x$_c$ is a cutoff semi-diameter;

n is a variable between 1 and 40; and

Add is a value that is equal to or less than the difference in power between the near vision power and distance vision power of the lens.

5. The lens of claim 4, wherein a is 1 and n is between 1 and 20.

6. The lens of claim 4 or 5, wherein the lens is a contact lens.

7. A multifocal ophthalmic lens, comprising of an optic zone comprising one or more multifocal power zones having a distance vision power and a near vision power wherein a speed for the optic zone is determined by the following equation:

$$\text{Add}_{(x)} = \text{Add}_{peak} * (1/(a*(1+(x/x_c)^d)*n)) \quad \text{(III)}$$

wherein:

Add$_{(x)}$ is an instantaneous add power at any point x on a surface of the lens;

x is a point on the lens surface at a distance x from the center of the lens;

a is a constant;

d is an arbitrary value between 1 and 40;

Add$_{peak}$ is a full peak dioptric add power;

x$_c$ is a cutoff semi-diameter;

n is between 1 and 20; and

Add is a value that is equal to or less than the difference in power between the near vision power and distance vision power of the lens.

8. The lens of claim 7, wherein a is 1 and n is between 1 and 20.

9. The lens of claim 7 or 8, wherein the lens is a contact lens.

10. The lens of claim 1, wherein n is a first value for $x<x_c$, is a second value for $x>x_c$ and is the first value or the second value for $x=x_c$.

11. The lens of claim 4, wherein n is a first value for $x<x_c$, is a second value for $x>x_c$ and is the first value or the second value for $x=x_c$.

12. The lens of claim 7, wherein n is a first value for $x<x_c$, is a second value for $x>x_c$ and is the first value or the second value for $x=x_c$.

* * * * *